Sept. 9, 1941.  S. I. RUIZ  2,255,366
ANTIGLARE LIGHT FOR ALL KINDS OF VEHICLES
Filed Feb. 27, 1939
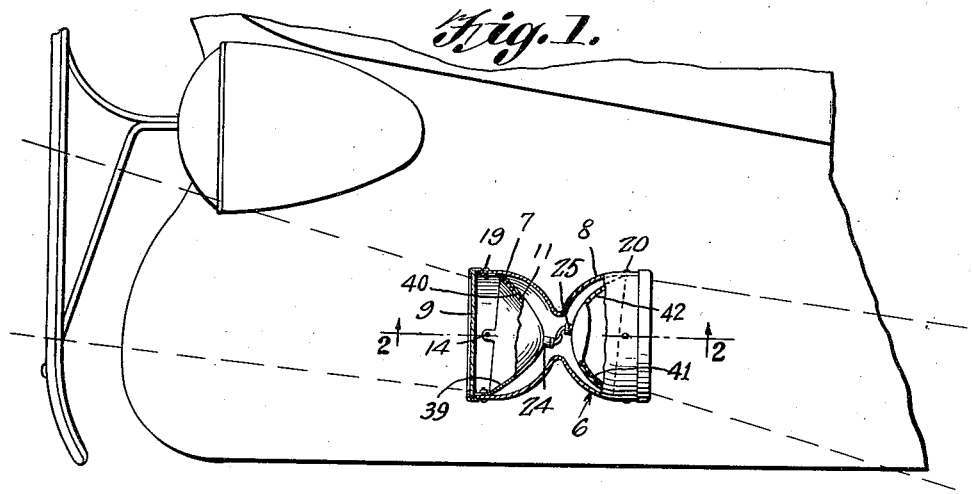
Salvador Islas Ruiz,
INVENTOR Patented Sept. 9, 1941

2,255,366

UNITED STATES PATENT OFFICE 2,255,366

ANTIGLARE LIGHT FOR ALL KINDS OF VEHICLES

Salvador Islas Ruiz, Mexico City, Mexico

Application February 27, 1939, Serial No. 258,846

3 Claims. (Cl. 240—8.2)

My invention relates to a lighting apparatus for automotive vehicles.

An important object of my invention is the provision of a lighting apparatus for automotive vehicles that will prevent the rays from being directed into the eyes of the driver of an oncoming vehicle.

Another object of my invention is the provision of a lighting apparatus for automotive vehicles that will clearly illuminate the right-hand side of the road in front of the vehicle and that will prevent the rays from being directed to the left side thereof.

Yet another object of my invention is the provision of a lighting apparatus for automotive vehicles that will simultaneously illuminate the side of the vehicle adjacent the center of the road, as well as the road ahead and to the right of the vehicle.

Still another object of my invention is the provision of an auxiliary light for an automotive vehicle that may be used independently of the standard lighting equipment on the vehicle, if desired.

A further object of my invention is the provision of a lighting apparatus for automotive vehicles that is simple in construction, efficient in operation and inexpensive to manufacture.

Other objects and advantages of my invention will be apparent during the course of the following description.

In the drawing, forming a part of this specification, and in which like numerals are employed to designate like parts throughout the same.

Figure 1 is a top plan view of a device embodying my invention, and showing its association with an automotive vehicle.

Figure 2 is a vertical sectional view, taken on the line 2—2 of Figure 1, and

Figure 3 is a schematic view of my device, and showing the electrical circuits associated therewith.

In the accompanying drawing, wherein for the purpose of illustration, is shown a preferred embodiment of my invention, the numeral 6 designates a hyperbolical casing having a forwardly facing paraboloidal section 7 and a rearwardly facing paraboloidal section 8, and the lenses 9 and 10 are bolted, or otherwise secured, to the openings 6' ad 7' of the said sections. Reflectors 11 and 12 are pivotally mounted in the front and rear sections 7 and 8 of the casing by means of the upper and lower pivot suspensions 13 and 14. Straps 15 and 16 project forwardly from the side of the reflectors and are provided with elongated slots 17 and 18 which receive the adjusting screws 19 and 20 carried by the casing 6.

The support 21 includes a base 22 which is adapted to be securely fastened to the fender 5 of the vehicle and a tubular shaft 23 extends upwardly therefrom and with the upper end thereof received by the casing 6 at substantially its middle. The reflectors 11 and 12 carry socket members 24 and 25 at the vertex thereof and the double filament bulbs 26 and 27 are positioned therein. The double conductor 28 is connected to the battery 29 of the vehicle and extends through the tubular member 23 of the support 21 with the lead 30 attached to the sockets 24 and 25 to energize the filaments 31 and 32 of the bulbs 26 and 27, and with the lead 35 attached to the sockets to energize the filaments 33 and 34. A two-way switch 36 is inserted in the line 28 and may be positioned at any place convenient to the operator of the vehicle, such as on the floorboard or dashboard of the automobile, and fuses 37 and 38 are inserted in the branches 30 and 35.

The operation of my device is as follows:

The support 21 is securely fastened to the fender 5 of the vehicle and with the major axis of the hyperbolical casing 6 in longitudinal alignment with the body of the vehicle. The reflectors 11 and 12 are pivotally mounted within the sections of the casing and may be rotated therein to any desired position and maintained in the selected angular adjustment by means of the straps 15 and 16 and adjusting screws 19 and 20.

I have found that by positioning the forward reflector 11 in a manner to direct the rays from the bulb 26 to the front and right of the vehicle, and that by positioning the rear reflector 12 so that the rays from the bulb 27 will be directed to the rear and left of the vehicle, all glare will be eliminated with respect to any oncoming automobile. In order to make certain that no light is reflected directly against the oncoming automobile I have painted the side 40 of the reflector 11 with a white paint or the like, but have left the side 39 of the reflector in its original condition to permit the reflection of rays therefrom to the outside or right-hand side of the road, and conversely, I have painted the outer side 41 of the rear reflector 12 with a white paint to prevent the reflection of light therefrom. The inner side 42 of the reflector 12 is left in its original condition to permit the reflection of the light therefrom onto the roadway at the left of the vehicle in a manner to illuminate the same to aid a motorist in an oncoming automobile.

My device may be used in conjunction with the lighting system usually carried by an automobile or it may be used independently thereof, as desired. If used in conjunction with the standard lighting system, a switch is provided whereby the conventional lights may be turned off when an oncoming vehicle is approaching, and my arrangement turned on; when used in this manner they function as dimming lights.

It is to be understood that the form of my invention herewith shown and described is to be taken as a preferred example of the same, and that various changes in the size, shape and arrangement of parts may be resorted to without departing from the spirit of my invention or the scope of the appended claims.

Having thus described my invention, I claim:

1. A vehicle headlamp construction comprising the combination of a casing having a pair of oppositely directed openings; a pair of reflectors, each being wholly accommodated within said casing in rearwardly spaced relation with and in confronting relation to a respective one of the openings and separately mounted for independent pivotal movement about a vertical axis, each of said reflectors having a slotted arm portion extending in the direction of its respective opening; and fastening means carried by the casing and received by the said slotted arm portions to limit the movement of the reflectors about their axes and to securely hold the same in a selected angular position relative to the casing, the positioning of the fastening means adjacent the openings in the casing permitting easy access to be had thereto and adjusting the said reflectors.

2. A vehicle headlamp construction comprising the combination of a casing having a pair of oppositely directed openings; a pair of reflectors each being wholly accommodated within said casing in longitudinally spaced relation with and in confronting relation to a respective one of the openings and separately mounted for independent pivotal movement about a vertical axis, each of said reflectors having a slotted arm portion extending in the direction of its respective opening; studs projecting inwardly from the sides of the casing and received by the said slotted arm portion; and nuts carried by the studs and movable against the said arm portions to hold the same in a selected adjusted position within the casing.

3. A vehicle headlamp construction comprising the combination of a casing having a pair of oppositely directed openings; a pair of reflectors each being wholly accommodated within said casing in spaced relation with and in confronting relation to a respective one of the openings and separately mounted for independent pivotal movement about a vertical axis, each of said reflectors having a slotted arm portion extending in the direction of its respective opening; fastening means carried by the casing and received by the said slotted arm portions in a manner to restrict the movement of the reflectors about their axes to limits defined by the said slots; separate lamp sockets in said reflectors; conductors connecting the sockets to a source of current; and lamps disposed within the sockets, parts of said reflectors being obscured in a manner whereby the beam of light from one of the lamps will be directed obliquely from the casing and to one side thereof and whereby the beam of light from the other of the lamps will be directed obliquely from the casing and to the opposite side thereof, the positioning of the said fastening means intermediate the reflectors and their respective openings permitting easy access to be had thereto, to permit the beams of light to be expeditiously and separately adjusted and fixedly secured in the said adjusted position.

SALVADOR ISLAS RUIZ.